US006652980B2

(12) United States Patent
Wu et al.

(10) Patent No.: US 6,652,980 B2
(45) Date of Patent: Nov. 25, 2003

(54) ELECTROCHROMIC MATERIAL AND METHOD FOR MAKING THE SAME

(75) Inventors: Shu-Yii Wu, Taichung (TW); Wen-Feng Chen, Taipei (TW)

(73) Assignee: Feng Chia University, Taichung (TW)

( * ) Notice: Subject to any disclaimer, the term of this patent is extended or adjusted under 35 U.S.C. 154(b) by 0 days.

(21) Appl. No.: 10/303,145

(22) Filed: Nov. 21, 2002

(65) Prior Publication Data

US 2003/0099849 A1 May 29, 2003

(30) Foreign Application Priority Data

Nov. 28, 2001 (TW) ........................................ 90129634 A

(51) Int. Cl.⁷ .......................... B32B 15/04; B05D 3/00; G02F 1/15
(52) U.S. Cl. ........................ 428/469; 359/265; 359/273; 427/304; 427/305; 428/426; 428/432; 428/689; 428/697; 428/702; 428/936
(58) Field of Search .................................. 428/469, 426, 428/432, 689, 697, 702, 936; 427/304, 305; 359/265, 273

(56) References Cited

U.S. PATENT DOCUMENTS 5,264,286 A * 11/1993 Ando et al. ................. 428/432

* cited by examiner

Primary Examiner—Robert R. Koehler
(74) Attorney, Agent, or Firm—Ladas & Parry

(57) ABSTRACT

A method for forming an electrochromic material includes the steps of (a) forming a transparent conductive film on a transparent substrate, (b) forming a metal film on the transparent conductive film by electroless plating, and (c) oxidizing the metal film to form a metal oxide film, which exhibits electrochromic characteristics on the transparent conductive film.

19 Claims, 3 Drawing Sheets

ELECTROCHROMIC MATERIAL AND METHOD FOR MAKING THE SAME

CROSS-REFERENCE TO RELATED APPLICATION

This application claims priority of Taiwanese Application No. 090129634, filed on Nov. 28, 2001.

BACKGROUND OF THE INVENTION

1. Field of the Invention

This invention relates to an electrochromic material, more particular to an electrochromic material and a method using electroless plating techniques for making the same.

2. Description of the Related Art

An electrochromic material normally includes a transparent substrate, a transparent conductive film formed on the substrate, and a metal oxide film formed on the conductive film. The metal oxide film, such as nickel oxide, can exhibit electrochromic characteristics when an electrical potential is applied thereto. The metal oxide film is formed by deposition of a metal film on the conductive film, followed by oxidizing the metal film. Conventionally, the metal film can be formed by a wet process, such as electrochemical deposition, sol-gel techniques, and spin-coating techniques, or by a dry process, such as vacuum evaporation, sputtering techniques, and electrode deposition. The sputtering techniques, such as rf-sputtering and reactive dc magnetron sputtering, require expensive equipment and a relatively large space. The sol-gel techniques may suffer from poor quality of the resulting metal film during removal of solvent upon heating. The electrode deposition suffers from poor cyclic ability and high aging rate of the metal oxide film.

SUMMARY OF THE INVENTION

Therefore, the object of the present invention is to provide a method using electroless plating techniques for making an electrochromic material that is capable of overcoming the aforementioned drawbacks of the prior art.

According to the present invention, there is provided a method for making an electrochromic material. The method comprises the steps of: (a) forming a transparent conductive film on a transparent substrate so as to form a plating substrate; (b) forming a metal film on the transparent conductive film of the plating substrate by electroless plating; and (c) oxidizing the metal film so as to form a metal oxide film, which exhibits electrochromic characteristics when an electrical potential is applied thereto, on the transparent conductive film.

BRIEF DESCRIPTION OF THE DRAWINGS

In the drawings which illustrate an embodiment of the invention.

DETAILED DESCRIPTION OF THE PREFERRED EMBODIMENT

Figure 1:
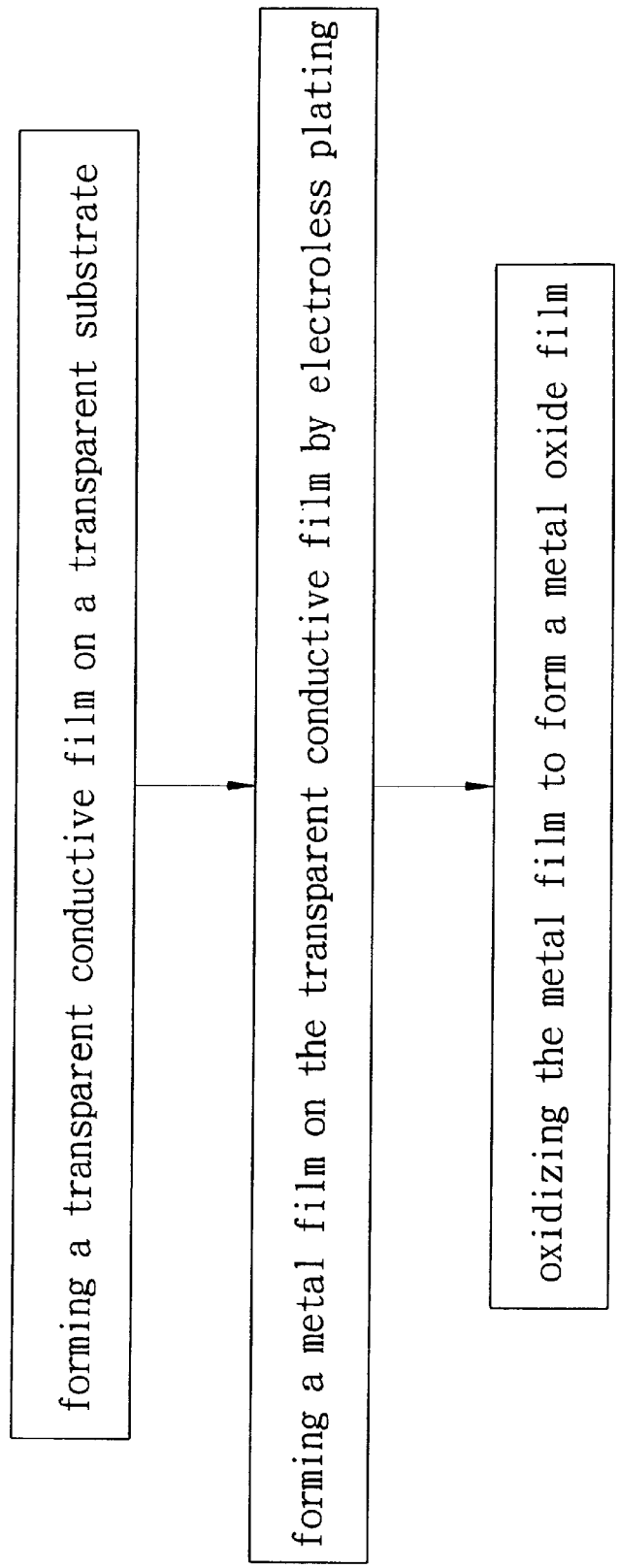
FIG. 1 is a block diagram illustrating consecutive steps of a preferred embodiment of a method of this invention for making an electrochromic material.

FIG. 1 is a block diagram illustrating consecutive steps of a preferred embodiment of a method of this invention for making an electrochromic material. The method includes the steps of: (a) forming a transparent conductive film on a transparent substrate so as to form a plating substrate; (b) forming a metal film on the transparent conductive film of the plating substrate by electroless plating; and (c) oxidizing the metal film so as to form a metal oxide film, which exhibits electrochromic characteristics when an electrical potential is applied thereto, on the transparent conductive film.

The metal film is made of nickel. The eletroless plating of the metal film on the plating substrate is carried out by using a plating bath with a composition that contains a water soluble nickel salt selected from the group consisting of nickel sulfate and nickel chloride, a reducing agent selected from the group consisting of hypophosphite salts, hydrazine, and sodium borohydride, and optionally, a chelating agent selected from the group consisting of trisodium citrate dihydrate, tartaric acid, sodium tartarate, citric acid, and ammonium chloride, and a buffer selected from the group consisting of boric acid, maleic acid, and itaconic acid. The electroless plating operation is preferably conducted at a temperature ranging from 40 to 60° C.

Preferably, the water soluble salt is nickel sulfate, the reducing agent is sodium hypophosphite, the chelating agent is trisodium citrate dihyrate ($Na_3C_6O_7H_5H_2O$), and the buffer is boric acid.

Preferably, the transparent substrate is made from a material selected from the group consisting of glass, polyvinyl chloride, polyethylene, polycarbonate, and polyethylene terephthalate.

Preferably, the transparent conductive film is made from a material selected from the group consisting of indium tin oxide (ITO), antimony tin oxide, fluorine-doped tin oxide, and iridium tin oxide, and is more preferably made from indium tin oxide.

Preferably, the metal oxide film is formed by heating the metal film on the transparent conductive film in the presence of oxygen at a temperature ranging from 150 to 450° C.

The plating substrate is preferably subjected to surface treatment prior to the electroless plating due to the difference in properties between the metal film and the conductive film so as to enhance the bonding strength between the metal film and the conductive film. The surface treatment includes the steps of degreasing the plating substrate, subsequently sensitizing the transparent conductive film with a sensitizing solution that contains a sensitizing agent selected from the group consisting of tin chloride and titanium chloride, followed by activating the transparent conductive film with an activating solution that contains an activating agent selected from the group consisting of palladium chloride and platinum chloride. The aforesaid sensitizing and activating operations are preferably conducted at a temperature ranging from room temperature to 50° C. For instance, when tin chloride and Palladium chloride are used for the sensitizing and activating agents, respectively, tin ions in the sensitizing solution will be trapped in micro pores in the surface of the conductive film during the sensitizing operation, and will be displaced by Palladium ions during the activating operation.

Preferably, the sensitizing agent is tin chloride, and the sensitizing solution is formed by dissolving the tin chloride in a hydrochloric acid solution.

Preferably, the activating agent is palladium chloride, and the activating solution is formed by dissolving the palladium chloride in a hydrochloric acid solution.

Figure 2:
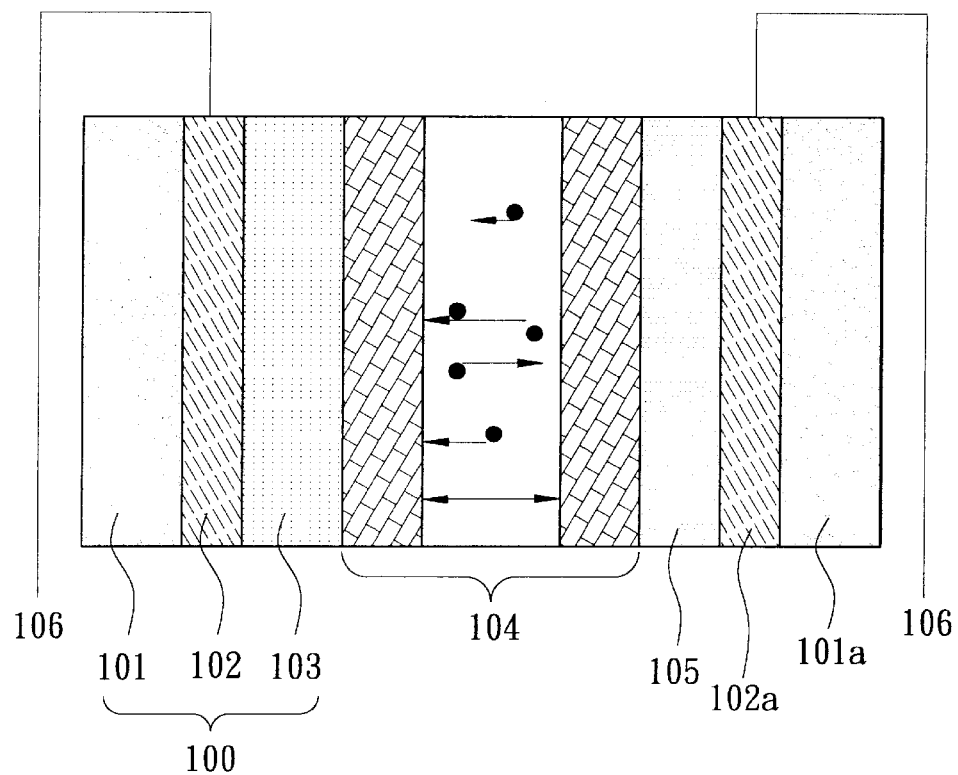
FIG. 2 is a schematic view of an electrochromic device with an electrochromic layer formed by the method of this invention.

FIG. 2 illustrates an electrochromic device (ECD) that includes an electrochromic layer 103 of an electrochromic material made according to the method of this invention. A polymer conductor layer 104 and a charge-balancing counter electrode layer 105 together with the electrochromic layer 103 are sandwiched between and are electrically connected to first and second electrode layers 102, 102a which are respectively formed on first and second glass substrates 101, 101a. The electrochromic layer 103 undergoes electrochemical oxidation and reduction when an electrical potential is applied to the first and second electrodes 102, 102a, which, in turn, results in changes in absorbance of the electromagnetic spectrum, thereby exhibiting coloring and bleaching characteristics.

The following Examples illustrate how the electrochromic material is made according to the method of this invention.

EXAMPLE 1

Materials used for the plating substrate were glass substrate and ITO conductive film. The plating substrate was degreased in a cleaning solution using ultrasonic techniques. The cleaning solution was prepared by dissolving a predetermined amount of a surface activating agent in 50 ml of de-ionized water. The plating substrate was subsequently washed with de-ionized water. The washed plating substrate was sensitized using a sensitizing solution with a composition that containing 0.5 grams of tin chloride ($SnCl_2$), 0.5 ml of hydrochloric acid, and 50 ml of de-ionized water. The sensitizing operation was carried out at room temperature for 5 to 50 minutes. The plating substrate was subsequently activated using an activating solution with a composition that contains 0.025 gram of Palladium chloride ($PdCl_2$), 0.5 ml of hydrochloric acid, and 50 ml of de-ionized water. The activating operation was carried out at room temperature for 2 to 20 minutes. The activated plating substrate was subsequently washed with de-ionized water, and was subjected to electroless plating in a bath with a composition that contains 1.6 grams of nickel sulfate, 3.61 grams of trisodium citrate dihydrate, 2.7 grams of ammonium chloride, and 0.75 gram of sodium hypophosphite. The electroless plating operation was carried out at a temperature from 45 to 85° C. for 0.5 to 20 minutes. The plated substrate was washed with de-ionized water, and was subsequently dried. The undesired plated metal film (nickel film) on one side of the plated substrate was removed using hydrochloric acid. The plated substrate was then subjected to oxidation by heating the same in the atmosphere at a temperature from 150 to 400° C. for 30 to 120 minutes, followed by annealing treatment to form a nickel oxide film on the ITO conductive film.

EXAMPLE 2

The experimental procedure of this Example is similar to Example 1, except that the composition of the plating bath contains 3.0 grams of nickel sulfate, 6.0 grams of trisodium citrate dihydrate, 4.0 grams of boric acid, and 2.0 grams of sodium hypophosphite.

Electrochromic Reaction Test

Figure 3:
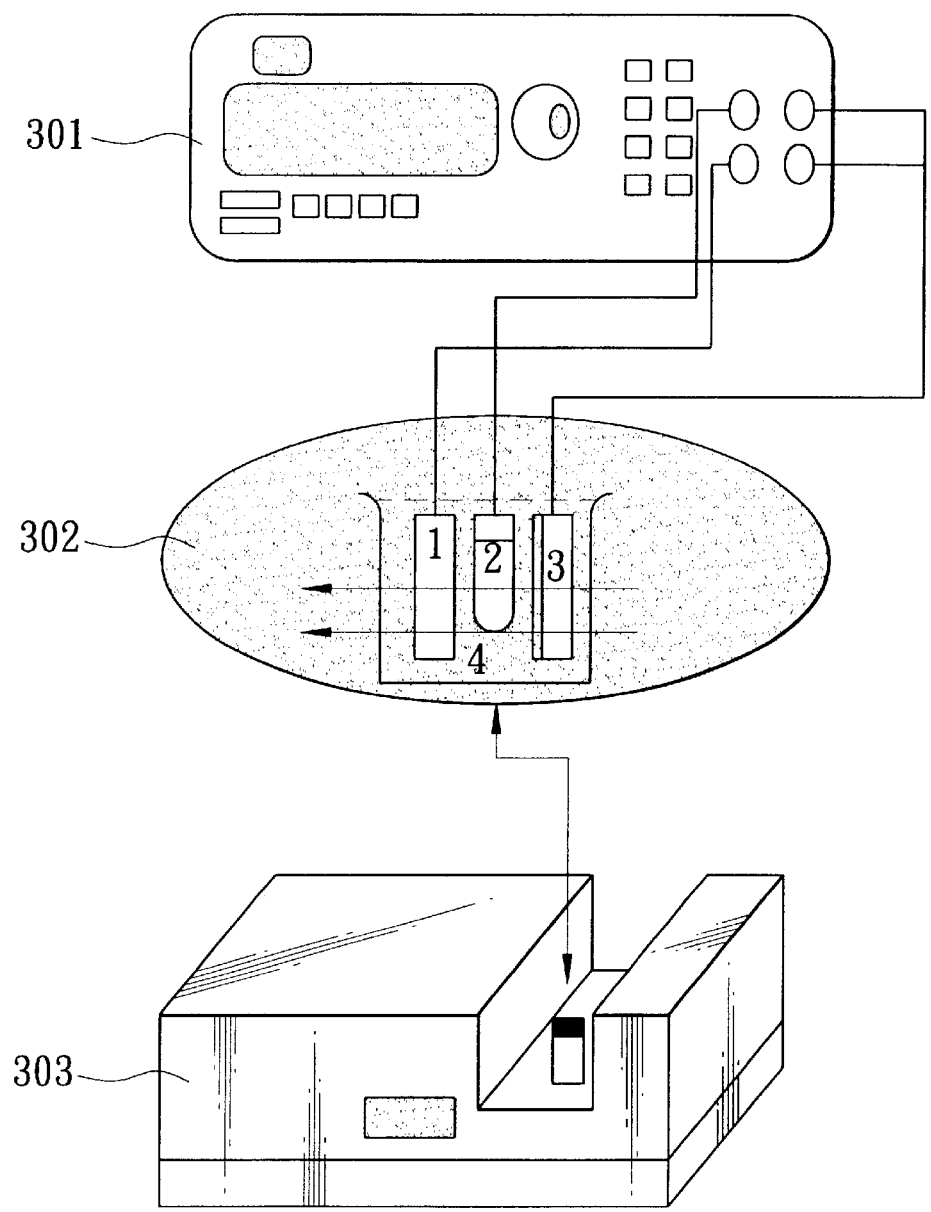
FIG. 3 is a schematic view to illustrate how the transmittance and aging of the electrochromic material formed according to the method of this invention are measured.

The resultant electrochromic materials formed in Example 1 and 2 were subjected to electrochromic reaction test using a Cyclic Voltammeter 301 and a UV Spectrum Analyzer 303, as shown in FIG. 3. Each of the resultant electrochromic materials was placed in a UV cell 302 for the test. The UV cell 302 includes a body of KOH electrolyte solution 4 with a counter electrode 1, a reference electrode 2 (Platinum electrode), and a working electrode 3 (using the electrochromic material) immersed therein. The electrochromic material of the working electrode 3 experienced the following reversible reactions during the test by applying +1.5V to −1.5V potential square-wave output and input voltage:

(A) $NiO + OH^- \leftrightarrow NiOOH + e^-$ (B) $Ni(OH)_2 + OH^- \leftrightarrow NiOOH + H_2O + e^-$ Formation of NiOOH in reaction (B) results in coloring of the electrochromic material, while formation of $Ni(OH)_2$ in reaction (B) results in bleaching of the eletrochromic material.

The UV Spectrum Analyzer measured the transmittance of the electrochromic material using visible light having wavelength ranging from 300 nm to 820 nm. The amount of transmittance change of the electrochromic material from one state ($Ni(OH)_2$), to another state (NiOOH), or vice versa, represents the electrochromic characteristics of the electrochromic material. Results showed that the transmittance change from NiOOH to $Ni(OH)_2$ or from $Ni(OH)_2$ to NiOOH after going through 1000 times of the eletrochromic reaction (B) was close to that at the initial electrochromic reaction (B), which is an indication of slower aging rate for the electrochromic material.

The Cyclic voltammeter measured the current change ($Amp/cm^2$) during the electrochromic reaction (B). Results showed that the current change after going through 1000 times of the electrochromic reaction (B) was close to that at the initial electrochromic reaction (B), which, again, is an indication of slower aging rate for the electrochromic material.

Comparing to the methods of the prior art, the method of this invention using electroless plating techniques is simple and cost effective for forming the electrochromic material, and the electrochromic material formed according to the method of this invention has a long service life.

With the invention thus explained, it is apparent that various modifications and variations can be made without departing from the spirit of the present invention. It is therefore intended that the invention be limited only as recited in the appended claims.

We claim:

1. A method for making an electrochromic material, comprising the steps of:
    (a) forming a transparent conductive film on a transparent substrate so as to form a plating substrate;
    (b) forming a metal film on the transparent conductive film of the plating substrate by electroless plating; and
    (c) oxidizing the metal film so as to form a metal oxide film, which exhibits electrochromic characteristics when an electrical potential is applied thereto, on the transparent conductive film.

2. The method of claim 1, wherein the metal film is made of nickel, and the electroless plating of the metal film on the plating substrate is carried out by using a plating bath with a composition that contains a water soluble nickel salt selected from the group consisting of nickel sulfate and nickel chloride, a reducing agent selected from the group consisting of hypophosphite salts, hydrazine, and sodium borohydride, and optionally, a chelating agent selected from the group consisting of trisodium citrate dihydrate, tartaric acid, sodium tartarate, citric acid, and ammonium chloride, and a buffer selected from the group consisting of boric acid, maleic acid, and itaconic acid.

3. The method of claim 2, wherein the water soluble salt is nickel sulfate, the reducing agent is sodium hypophosphite, the chelating agent is trisodium citrate dihydrate, and the buffer is boric acid.

4. The method of claim 2, wherein the transparent substrate is made from a material selected from the group consisting of glass, polyvinyl chloride, polyethylene, polycarbonate, and polyethylene terephthalate.

5. The method of claim 4, wherein the transparent conductive film is made from a material selected from the group consisting of indium tin oxide, antimony tin oxide, fluorine-doped tin oxide, and iridium tin oxide.

6. The method of claim 5, wherein the metal oxide film is formed by heating the metal film on the transparent conductive film in the presence of oxygen at a temperature ranging from 150 to 450° C.

7. The method of claim 2, further comprising degreasing the plating substrate, subsequently sensitizing the transparent conductive film with a sensitizing solution that contains a sensitizing agent selected from the group consisting of tin chloride and titanium chloride, followed by activating the transparent conductive film with an activating solution that contains an activating agent selected from the group consisting of palladium chloride and platinum chloride, before electroless plating of the plating substrate.

8. The method of claim 7, wherein the sensitizing agent is tin chloride, and the sensitizing solution is formed by dissolving the tin chloride in a hydrochloric acid solution.

9. The method of claim 8, wherein the activating agent is palladium chloride, and the activating solution is formed by dissolving the palladium chloride in a hydrochloric acid solution.

10. An electrochromic material, comprising:
a transparent substrate;
a transparent conductive film formed on said transparent substrate; and
a metal oxide film which is formed on said transparent conductive film and which exhibits electrochromic characteristics when an electrical potential is applied thereto;
wherein said metal oxide film is formed by electroless plating a metal film on said transparent conductive film, followed by oxidizing said metal film.

11. The electrochromic material of claim 10, wherein said metal film is made of nickel, and the electroless plating of said metal film on said transparent conductive film is carried out by using a plating bath with a composition that contains a water soluble nickel salt selected from the group consisting of nickel sulfate and nickel chloride, a reducing agent selected from the group consisting of hypophosphite salts, hydrazine, and sodium borohydride, and optionally, a chelating agent selected from the group consisting of trisodium citrate dihydrate, tartaric acid, sodium tartarate, citric acid, and ammonium chloride, and a buffer selected from the group consisting of boric acid, maleic acid, and itaconic acid.

12. The electrochromic material of claim 11, wherein said water soluble salt is nickel sulfate, said reducing agent is sodium hypophosphite, said chelating agent is trisodium citrate dihydrate, and said buffer is boric acid.

13. The electrochromic material of claim 12, wherein said transparent substrate is made from a material selected from the group consisting of glass, polyvinyl chloride, polyethylene, polycarbonate, and polyethylene terephthalate.

14. The electrochromic material of claim 13, wherein said transparent conductive film is made from a material selected from the group consisting of indium tin oxide, antimony tin oxide, fluorine-doped tin oxide, and iridium tin oxide.

15. The electrochromic material of claim 14, wherein said metal oxide film is formed by heating said metal film on said transparent conductive film in the presence of oxygen at a temperature ranging from 150 to 450° C.

16. An electrochromic device, comprising:
spaced apart first and second electrode layers; and
an electrochromic layer sandwiched between and electrically connected to said first and second electrode layers;
wherein said electrochromic layer includes a transparent substrate, a transparent conductive film on said transparent substrate, and a metal oxide film that exhibits electrochromic characteristics when an electrical potential is applied thereto, said metal oxide film being formed by electroless plating a metal film on said transparent conductive film, followed by oxidizing said metal film.

17. The electrochromic device of claim 16, wherein said metal film is made of nickel, and the electroless plating of said metal film on said transparent conductive film is carried out by using a plating bath with a composition that contains a water soluble nickel salt selected from the group consisting of nickel sulfate and nickel chloride, a reducing agent selected from the group consisting of hypophosphite salts, hydrazine, and sodium borohydride, and optionally, a chelating agent selected from the group consisting of trisodium citrate dihydrate, and a buffer selected from the group consisting of boric acid, maleic acid, and itaconic acid.

18. The electrochromic device of claim 17, wherein said water soluble salt is nickel sulfate, said reducing agent is sodium hypophosphite, said chelating agent is trisodium citrate dihydrate, and said buffer is boric acid.

19. The electrochromic device of claim 18, wherein said metal oxide film is formed by heating said metal film on said transparent conductive film in the presence of oxygen at a temperature ranging from 150 to 450° C.

* * * * *